United States Patent
Wu et al.

(10) Patent No.: US 10,348,793 B2
(45) Date of Patent: Jul. 9, 2019

(54) METHOD, DEVICE AND MEDIUM FOR DETERMINING CODING FORMAT

(71) Applicant: Beijing Xiaomi Mobile Software Co., Ltd., Haidian District, Beijing (CN)

(72) Inventors: Ming Wu, Beijing (CN); Hengbin Cui, Beijing (CN); Qi Wang, Beijing (CN)

(73) Assignee: BEIJING XIAOMI MOBILE SOFTWARE CO., LTD., Haidian District, Beijing ( * ) Notice: Subject to any disclaimer, the term of this patent is extended or adjusted under 35 U.S.C. 154(b) by 0 days.

(21) Appl. No.: 15/635,207

(22) Filed: Jun. 28, 2017

(65) Prior Publication Data
US 2018/0007110 A1    Jan. 4, 2018

(30) Foreign Application Priority Data
Jun. 30, 2016    (WO) ................ PCT/CN2016/087909

(51) Int. Cl.
| | |
|---|---|
| H04L 1/00 | (2006.01) |
| H04M 7/00 | (2006.01) |
| G10L 19/18 | (2013.01) |
| H04L 29/06 | (2006.01) |
| H04L 12/911 | (2013.01) |

(52) U.S. Cl.
CPC ........ *H04L 65/604* (2013.01); *H04L 65/1006* (2013.01); *H04L 65/1046* (2013.01); *H04L 65/1059* (2013.01); *H04L 65/1069* (2013.01); *H04L 65/608* (2013.01); *G10L 19/18* (2013.01); *H04L 1/0014* (2013.01); *H04L 47/74* (2013.01); *H04M 7/0072* (2013.01)

(58) Field of Classification Search
CPC ............... H04L 65/604; H04L 65/1006; H04L 65/1046; H04L 65/1059; H04L 65/608; H04M 7/0072
USPC ........................................................ 370/352
See application file for complete search history.

(56) References Cited

U.S. PATENT DOCUMENTS

| | | | | |
|---|---|---|---|---|
| 2009/0209255 A1* | 8/2009 | Lassers | ............... | H04W 88/181 455/436 |
| 2017/0215056 A1* | 7/2017 | Edge | ....................... | H04W 4/90 |

FOREIGN PATENT DOCUMENTS

| | | |
|---|---|---|
| CN | 101953200 A | 1/2011 |
| EP | 1565010 A1 | 8/2005 |
| WO | 2010117326 A1 | 10/2010 |

OTHER PUBLICATIONS

Extended European Search Report for EP application 17177611.5, dated Dec. 1, 2017.
(Continued)

*Primary Examiner* — Christopher R Crompton
(74) *Attorney, Agent, or Firm* — Jun He Law Offices P.C.; James J. Zhu

(57) ABSTRACT

A method, device and medium for determining a coding format are provided. The method includes: receiving one or more data packets forwarded by a call center during a VoLTE communication, in which the one or more data packets carry a first coding format; detecting whether the first coding format is same with a negotiated second coding format; and modifying the coding format used during the VoLTE communication from the second coding format to the first coding format, if the first coding format is not same with the negotiated second coding format.

12 Claims, 5 Drawing Sheets

(56) References Cited

OTHER PUBLICATIONS

Huawei et al., "RAN based codec adaptation mechanism", vol. RAN WG2, No. Dubrovnik, Croatia; Apr. 11, 2016-Apr. 15, 2016, Apr. 2, 2016, XP051082484, retrieved from the Internet: URL:http://www.3gpp.org/ftp/tsg_ran/WG2_RL2/TSGR2_93bis/Docs/, retrieved on Apr. 2, 2016.

Bruhn Stefan et al., "System aspects of the 3GPP evolution towards enhanced voice services", 2015 IEEE Global Conference on Signal and Information Processing (GLOBALSIP), IEEE, pp. 483-487, XP032871706, Dec. 14, 2015, DOI: 10.1109/GLOBALSIP.2015.7418242.

International Search Report for PCT application No. PCT/CN2016/087909.

English translation of the International Search Report for PCT application No. PCT/CN2016/087909.

* cited by examiner

METHOD, DEVICE AND MEDIUM FOR DETERMINING CODING FORMAT

CROSS REFERENCE TO RELATED APPLICATION

This application is based upon and claims a priority to International Patent Application Serial No. PCT/CN2016/087909, filed with the State Intellectual Property Office of P. R. China on Jun. 30, 2016, the entire contents of which are incorporated herein by reference.

TECHNICAL FIELD

The present disclosure relates to the field of communication technology, and more particularly, to a method, device and medium for determining a coding format.

BACKGROUND

Voice over Long Term Evolution (VoLTE) communication refers to network communication realized by communicating data packets between a calling terminal and a called terminal.

Typically, the process of VoLTE communication includes: sending a request message to a call center by the calling terminal, in which a called number and a coding format supported by the calling terminal are carried in the request message; forwarding the request message received to the called terminal by the call center; sending a request response to the calling terminal by the called terminal via the call center, in which a coding format supported by the called terminal is carried in the request response; reaching a negotiation between the called terminal and the calling terminal via the call center to determine the coding format used during the communication. If data carried in the data packets sent is coded by the calling terminal according to the negotiated coding format, the called terminal decodes the data according to the negotiated coding format after receiving the data packets, thereby finishing the VoLTE communication.

If there is something wrong in the calling terminal, the data carried in the data packets sent may be coded by the calling terminal with a coding format different from the negotiated coding format. Then, the called terminal may be unable to decode the data according to the negotiated coding format, which may cause a mistake in the VoLTE communication.

SUMMARY

According to embodiments of the present disclosure, there is provided a method for determining a coding format. The method includes: receiving one or more data packets forwarded by a call center during a VoLTE communication, in which the one or more data packets carry a first coding format; detecting whether the first coding format is same with a negotiated second coding format; and modifying the coding format used during the VoLTE communication from the second coding format to the first coding format, if the first coding format is not same with the negotiated second coding format.

According to embodiments of the present disclosure, there is provided a device for determining a coding format. The device includes: a processor; and a memory configured to store an instruction executable by the processor; in which the processor is configured to: receive one or more data packets forwarded by a call center during a VoLTE communication, in which the one or more data packets carry a first coding format; detect whether the first coding format is same with a negotiated second coding format; and modify the coding format used during the VoLTE communication from the second coding format to the first coding format, if the first coding format is not same with the negotiated second coding format.

According to embodiments of the present disclosure, there is provided a non-transitory computer-readable storage medium having stored therein instructions that, when executed by a processor of a device, causes the device to perform a method for determining a coding format, the method including: receiving one or more data packets forwarded by a call center during a VoLTE communication, wherein the one or more data packets carry a first coding format; detecting whether the first coding format is same with a negotiated second coding format; and modifying the coding format used during the VoLTE communication from the second coding format to the first coding format, if the first coding format is not same with the negotiated second coding format.

It is to be understood that, both the foregoing general description and the following detailed description are exemplary and explanatory only and are not restrictive of the present disclosure.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

For ease of understanding, an exemplary VoLTE calling process is described as below.

At the first step, a calling terminal sends an INVITE message to a call center via a Session Initiation Protocol (SIP), in which a number of a called terminal and a coding format supported by the calling terminal are carried in the INVITE message.

For example, the coding format supported by the calling terminal includes: AMR-WB (Adaptive Multi-rate-Wideband) 104, AMR-WB 105 and AMR-WB 106.

At the second step, the call center feeds a response message back to the calling terminal after receiving the INVITE message sent by the calling terminal, in which the response message is configured to indicate that the INVITE message is being processed.

At the third step, the call center forwards the INVITE message to the called terminal when the called terminal is in idle.

At the fourth step, the called terminal responds to the INVITE message received and sends an INVITE response to the calling terminal via the call center, in which a coding format supported by the called terminal is carried in the INVITE response.

For example, the coding format supported by the called terminal includes: AMR-WB 104, AMR-WB 106 and AMR-WB 107.

At the fifth step, the calling terminal feeds a verifying message PRACK back to the called terminal via the call center after receiving the INVITE response forwarded by the call center.

At the sixth step, the called terminal feeds a PRACK response back to the calling terminal via the call center after receiving the PRACK.

At the seventh step, the calling terminal sends an UPDATE message to the called terminal via the call center after receiving the PRACK response forwarded by the call center, in which a negotiated coding format is carried in the UPDATE message.

For example, the coding format is determined as AMR-WB 104 after the negotiation between the calling terminal and the called terminal.

At the eighth step, the called terminal sends an UPDATE response to the calling terminal via the call center after receiving the UPDATE message, in which the UPDATE response is configured to indicate that a negotiation of the coding format is completed. The VoLTE calling process is completed and a VoLTE communication process is started.

Figure 1:
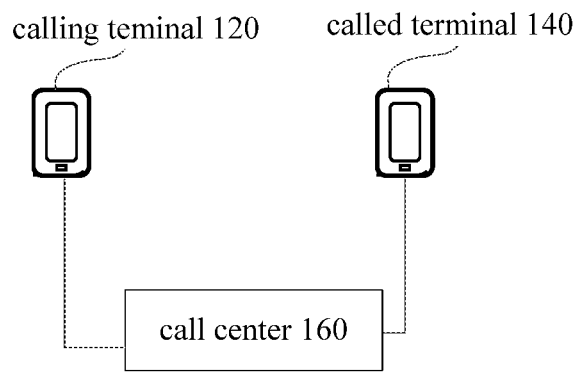
FIG. 1 is a schematic diagram illustrating a context in which a method for determining a coding format is implemented according to some exemplary embodiments.

FIG. 1 is a schematic diagram illustrating a context in which to a method for determining a coding format is implemented according to some exemplary embodiments. As shown in FIG. 1, the context may include: a calling terminal 120, a called terminal 140 and a call center 160.

The calling terminal 120 may be a smart phone, an e-book reader, a MP3 (Moving Picture Experts Group Audio Layer III) player, a MP4 (Moving Picture Experts Group Audio Layer IV) player, a laptop computer, and the like.

The calling terminal 120 connects with the call center 160 through a mobile data network. The data packets transmitted by the calling terminal 120 are forwarded to the called terminal 140 after processed by the call center 160. The called terminal 140 connects with the call center 160 through the mobile data network. The data packets transmitted by the called terminal 140 are forwarded to the calling terminal 120 after processed by the call center 160.

The called terminal 140 may be a smart phone, an e-book reader, a MP3 player, a MP4 player, a laptop computer, and the like.

Figure 2:
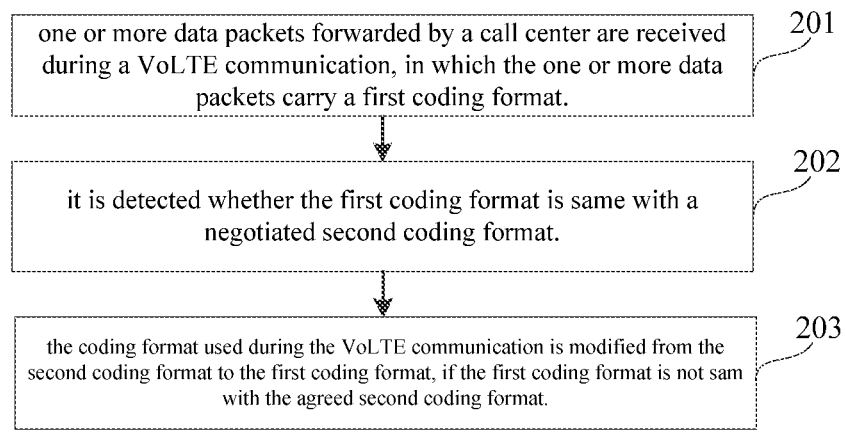
FIG. 2 is a flow chart showing a method for determining a coding format according to an exemplary embodiment.

FIG. 2 is a flow chart showing a method for determining a coding format according to an exemplary embodiment. For illustration purpose, the method can be applied in the called terminal 140 of FIG. 1. The method includes following steps.

At step 201, one or more data packets forwarded by the call center are received during a VoLTE communication, in which a first coding format is carried in the one or more data packets.

At step 202, it is detected whether the first coding format is same with a negotiated second coding format.

At step 203, the coding format used during the VoLTE communication is modified from the second coding format to the first coding format, if the first coding format is not same with a negotiated second coding format.

As described above, with the method provided in the embodiment, a decoding mistake and a communication interruption are avoided, which are resulted from that data carried in the one or more data packets sent is coded by the calling terminal with a coding format different from the coding format negotiated, and the called terminal may be unable to decode the data with the coding format negotiated. Furthermore, it is realized that the one or more data packets received are decoded according to the first coding format if the first coding format carried in the one or more data packets is different from the negotiated second coding format, thereby ensuring a high quality of the VoLTE communication.

Figure 3:
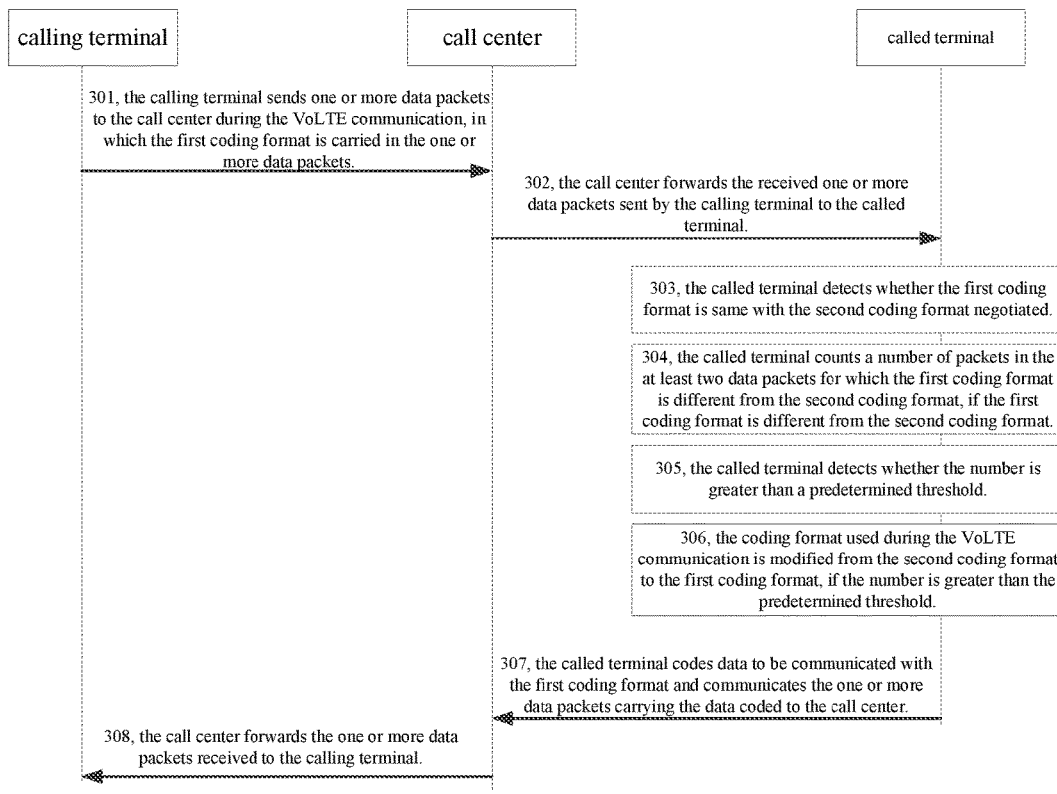
FIG. 3 is a flow chart showing a method for determining a coding format according to another exemplary embodiment.

FIG. 3 is a flow chart showing a method for determining a coding format according to another exemplary embodiment. For illustration purpose, the method may be applied in the context of FIG. 1 and includes following steps.

At step 301, the calling terminal sends one or more data packets to the call center during the VoLTE communication, in which the one or more data packets carry the first coding format.

After coding the data to be sent according to the first coding format, the calling terminal sends the one or more data packets carrying the coded data to the call center, in which the one or more data packets are sent to the called terminal by the calling terminal via the call center.

Alternatively, the one or more data packets are RTP voice packets.

Figure 4:
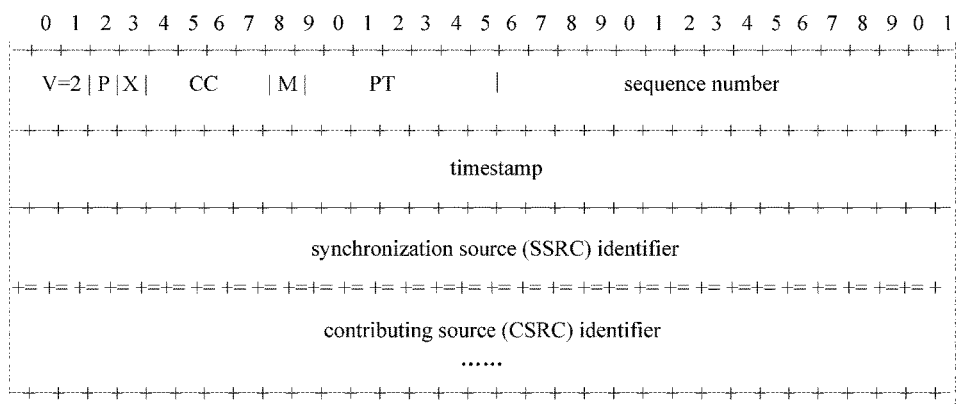
FIG. 4 is a schematic diagram illustrating a header of a Realtime Transport Protocol (RTP) voice packet according to an exemplary embodiment.

In an exemplary example, a header of the REP voice packet is shown as FIG. 4. 32 bits are included in every row, in which each of locations of numbers 0-9 represents 1 bit, "v" represents a version of the RTP voice packet and takes up 2 bits, for example, v=2 indicates that the RTP voice packet is the second version; "P" indicates whether an end is filled or not and takes up 1 bit, and P=1 if the end is filled; "X" represents an extension and takes up 1 bit; "CC" represents the number of contributing source (CSRC) identifiers and takes up 4 bits; "M" represents a mark and takes up 1 bit; "PT" represents a type of the RTP voice packet payload and takes up 7 bits; sequence number takes up 16 bits, which is added by 1 after sending one RTP voice packet; and timestamp takes up 32 bits, which records a sampling time of the first byte in the RTP voice packet; synchronization source (SSRC) identifier takes up 32 bits; contributing source (CSRC) identifier includes one or more items, in which the number of the items ranges from 1 to 15, each of the one or more items takes up 32 bits and is configured to indicate all RTP voice packet sources contributing to a new RTP voice packet.

At step 302, the call center forwards the received one or more data packets sent by the calling terminal to the called terminal.

At step 303, the called terminal detects whether the first coding format is same with the second coding format negotiated.

The called terminal acquires the first coding format carried in the one or more data packets after receiving the one or more data packets forwarded by the call center.

In an exemplary example, the first coding format acquired by the called terminal is a value of PT in the header of each RTP voice packet if the one or more data packets are RTP voice packets.

The called terminal compares the acquired first coding format with the second coding format negotiated previously and detects whether the first coding format acquired is same with the second coding format negotiated previously.

There may be two detecting results during a process of detecting by the called terminal. The data carried in the one or more data packets received is decoded with the second coding format negotiated previously if the first coding format acquired is same with the second coding format negotiated previously; and a step 304 is executed if the first coding format acquired is different from the second coding format negotiated previously.

Alternatively, the one or more data packets forwarded by the call center are at least one data packet. There may be two conditions if the first coding format acquired is different from the second coding format negotiated previously. In one hand, a step 306 of modifying the coding format used during the VoLTE communication from the second coding format to the first coding format is directly executed, if the one or more data packets forwarded by the call center are only one data packet; in another hand, the step 304 is executed if the one or more data packets forwarded by the call center are at least two data packets.

At step 304, the called terminal counts, in the at least two data packets, the number of packets of which the first coding format is different from the second coding format, if the first coding format is different from the second coding format.

The called terminal acquires the first coding format carried in each data packet if receiving the at least two data packets forwarded by the call center. And then the called terminal compares each first coding format acquired with the second coding format negotiated previously and counts the number of the packets of which the acquired first coding format is different from the second coding format negotiated previously.

For example, 5 data packets forwarded by the call center are received by the called terminal. It is assumed that 3 data packets carry the first coding format and the other 2 data packets carry the second coding format, thus the number of the packets in the 5 data packets of which the first coding format is different from the second coding format is 3.

At step 305, the called terminal detects whether the number is greater than a predetermined threshold.

After counting, in the at least data packets, the number of the packets of which the first coding format is different from the second coding format, the called terminal compares the counted number with the predetermined threshold and detects whether the counted number is greater than the predetermined threshold. The predetermined threshold may be any positive integer.

For example, it is assumed that the predetermined threshold is 2, in the above example, the number of the packets in the 5 data packets for which the first coding format is different from the second coding format is counted by the called terminal to be 3. Then, the called terminal detects that the number 3 is greater than the predetermined threshold 2.

There may be two detecting results when the called terminal detects whether the number is greater than the predetermined threshold. The step 306 is executed if it is detected that the number is greater than the predetermined threshold; and the called terminal neglects to code the data carried in the data packets carrying the first coding format.

The data packets carrying the first coding format are neglected by the called terminal if the called terminal detects that the number of the packets in the at least two data packets of which the first coding format is different from the second coding format is less than the predetermined threshold.

Alternatively, to ensure a normal quality of the VoLTE communication, the predetermined threshold is generally set to be 1. That is, the coding format used during the VoLTE communication is modified from the second coding format to the first coding format if it is detected that the first coding format is different from the second coding format negotiated previously.

At step 306, the coding format used during the VoLTE communication is modified by the called terminal from the second coding format to the first coding format, if the number is greater than the predetermined threshold.

The coding format used during the VoLTE communication is modified by the called terminal from the second coding format to the first coding format, if the called terminal detects that the counted number of the packets in the at least two data packets of which the first coding format is different from the second coding format is greater than the predetermined threshold. The first coding format is used to code data carried in the one or more data packets received to acquire information included in the data, so as to ensure the normal quality of the VoLTE communication.

As a possible implementation, the method for determining a coding format may further include followings.

At step 307, the called terminal codes data to be transmitted according to the first coding format and transmits the one or more data packets carrying the coded data to the call center.

The called terminal codes the data to be transmitted according to the first coding format after verifying the first coding format as the second coding format, and transmits the one or more data packets carrying the coded data with the first coding format to the call center, such that the call center forwards the one or more data packets to the calling terminal.

At step 308, the call center forwards the one or more data packets received to the calling terminal.

As described above, with the method provided in the embodiment, a decoding mistake and the communication interruption are avoided, which are resulted from that the data carried in the one or more data packets sent is coded by the calling terminal with a coding format different from the negotiated coding format, and the called terminal may be unable to decode the data with the negotiated coding format. Furthermore, it is realized that the one or more data packets received are decoded with the first coding format if the first coding format carried in the one or more data packets is different from the negotiated second coding format, thereby ensuring a high quality of the VoLTE communication.

Figure 5:
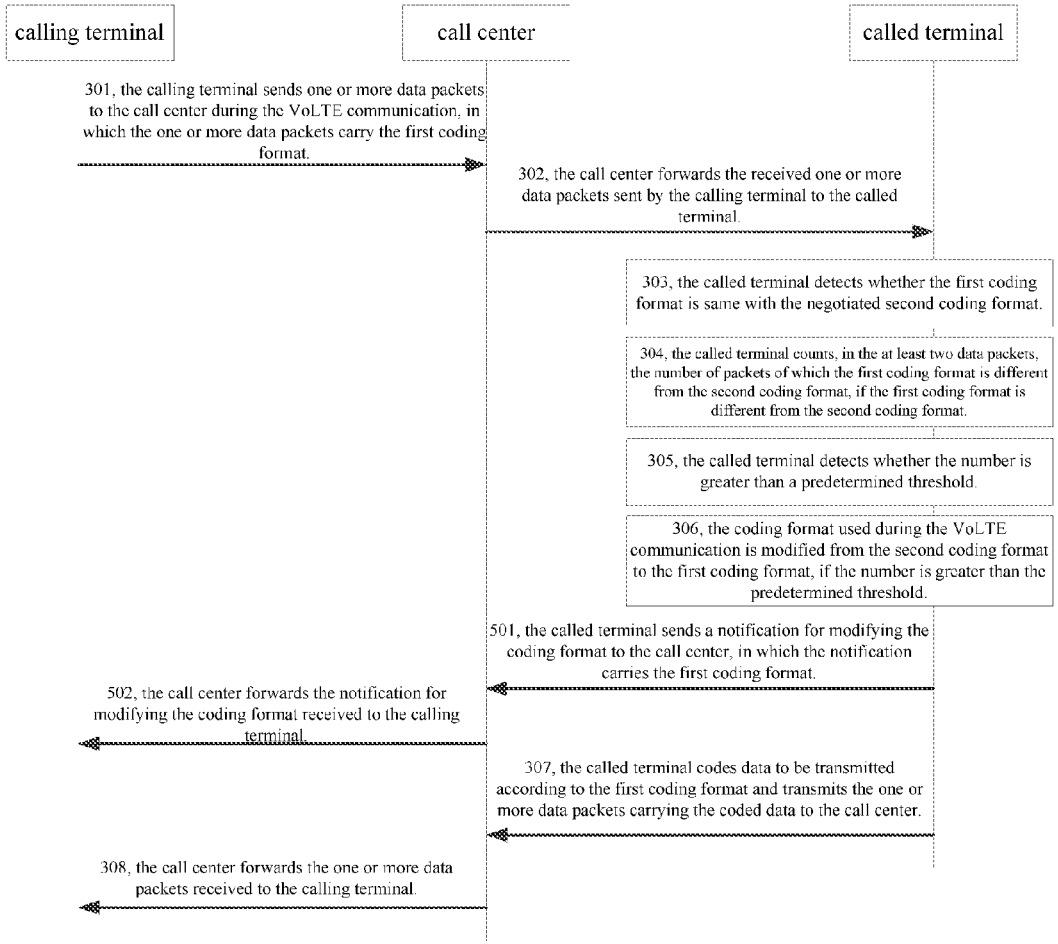
FIG. 5 is a flow chart showing a method for determining a coding format according to an exemplary embodiment.

The method may further include followings, shown as FIG. 5, before the called terminal sends the one or more data packets carrying the data coded with the first coding format to the call center.

At step 501, the called terminal sends a notification for modifying the coding format to the call center, in which the first coding format is carried in the notification.

The called terminal sends the notification for modifying the coding format to the call center after modifying the coding format used during the VoLTE communication from the second coding format to the first coding format, in which the notification for modifying the coding format is configured to notify the call center that the data carried in the one or more data packets forwarded by the call center is coded with the first coding format.

At step 502, the call center forwards the notification for modifying the received coding format to the calling terminal.

The call center forwards the notification for modifying the received coding format to the calling terminal after receiving the notification for modifying the coding format so as to notify the calling terminal that the called terminal will code the data to be transmitted according to the first coding format and the calling terminal needs to use the first coding format to decode the received data transmitted by the called terminal.

Figure 6:
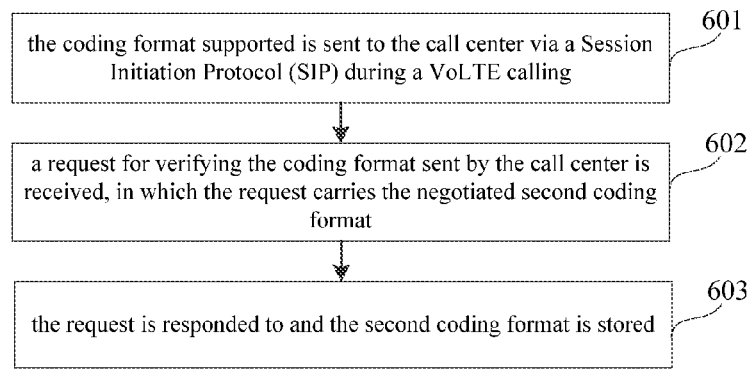
FIG. 6 is a flow chart showing a method for negotiating a coding format according to an exemplary embodiment.

It is also to be illustrated that, the method for determining a coding format may further include followings, shown as FIG. 6, before the called terminal receives the one or more data packets forwarded by the call center.

At step 601, the coding format supported by a calling terminal is sent to the call center via a SIP during a VoLTE calling.

Before the VoLTE communication, it needs to complete the VoLTE calling between the calling terminal and the called terminal via the call center. During the VoLTE calling, the called terminal sends the coding format supported by the called terminal to the calling terminal via the SIP.

At step 602, a request for verifying the coding format sent by the call center is received, in which the request carries the negotiated second coding format.

A coding format collectively supported by both the calling terminal and the called terminal is selected as the negotiated second coding format after a negotiation between the calling terminal and the called terminal via the call center.

The called terminal receives the request for verifying the coding format sent by the call center after determining the negotiated second coding format, in which the request for verifying the coding format is configured to verify the negotiated second coding format.

At step 603, the request is responded to and the second coding format is stored.

The called terminal responds to the request for verifying the coding format after receiving the request for verifying the coding format. The response indicates that the called terminal verifies the negotiated second coding format. The called terminal stores or marks the second coding format after verifying the negotiated second coding format, such that the second coding format is used to code the data to be transmitted during the VoLTE communication.

Below is device embodiment of the present disclosure, which is configured to execute method embodiment of the present disclosure. Those details that are not disclosed in the device embodiment may be referred to method embodiment.

Figure 7:
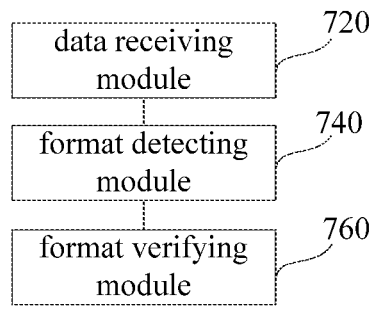
FIG. 7 is a block diagram of a device for determining a coding format according to an exemplary embodiment.

FIG. 7 is a block diagram of a device for determining a coding format according to an exemplary embodiment. As shown in FIG. 7, the device is applied in the called terminal 140 of FIG. 1. The device includes but is not limited to: a data receiving module 720, a format detecting module 740 and a format verifying module 760.

The data receiving module 720 is configured to receive one or more data packets forwarded by a call center during a VoLTE communication, in which the one or more data packets carry a first coding format.

The format detecting module 740 is configured to detect whether the first coding format is same with a negotiated second coding format.

The format verifying module 760 is configured to modify the coding format used during the VoLTE communication from the second coding format to the first coding format, if not.

As described above, with the device provided in embodiments of the present disclosure, a decoding mistake and the communication interruption are avoided, which are resulted from that data carried in the one or more data packets is coded by the calling terminal with a coding format different from the negotiated coding format, and the called terminal may be unable to decode the data with the negotiated coding format. Furthermore, it is realized that the one or more data packets received are decoded with the first coding format if the first coding format carried in the one or more data packets is different from the negotiated second coding format, thereby ensuring a high quality of the VoLTE communication.

Figure 8:
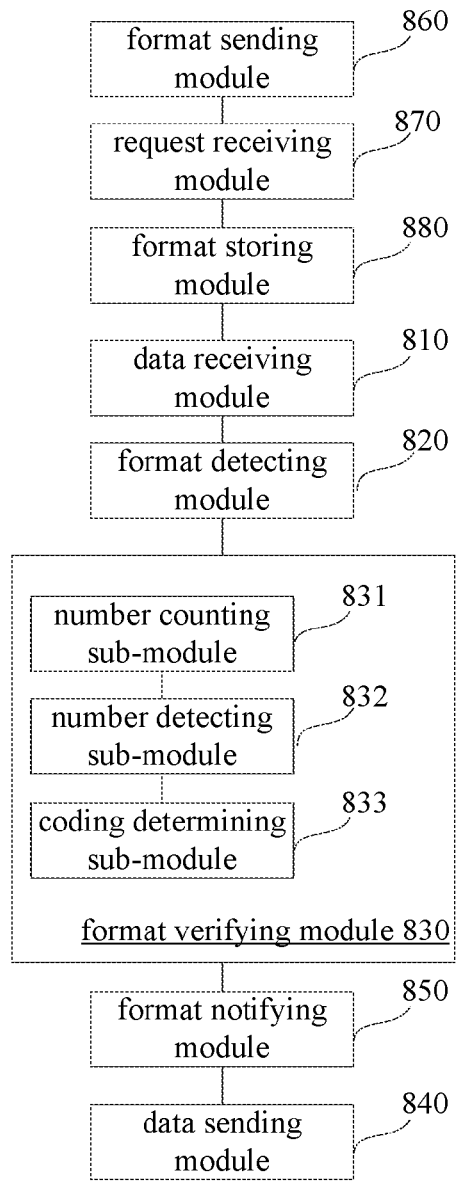
FIG. 8 is a block diagram of a device determining a coding format according to another exemplary embodiment.

FIG. 8 is a block diagram of a device for determining a coding format according to another exemplary embodiment. As shown in FIG. 8, the device is applied in the called terminal 140 in the implementation context shown in FIG. 1. The device includes but is not limited to: a data receiving module 810, a format detecting module 820 and a format verifying module 830.

The data receiving module 810 is configured to receive one or more data packets forwarded by a call center during a VoLTE communication, in which the one or more data packets carry a first coding format.

The format detecting module 820 is configured to detect whether the first coding format is same with a negotiated second coding format.

The format verifying module 830 is configured to modify the coding format used during the VoLTE communication from the second coding format to the first coding format, if the first coding format is not same with the negotiated second coding format.

Alternatively, the one or more data packets are at least two data packets; and the format verifying module 830 includes: a number counting sub-module 831, a number detecting sub-module 832 and a coding determining sub-module 833.

The number counting sub-module 831 is configured to count, in the at least two data packets, the number of packets of which the first coding format carried is different from the second coding format.

The number detecting sub-module 832 is configured to detect whether the number is greater than a predetermined threshold.

The coding determining sub-module 833 is configured to modify the coding format used during the VoLTE communication from the second coding format to the first coding format, if the number is greater than the predetermined threshold.

Alternatively, the device may further include: a data sending module 840.

The data sending module 840 is configured to code data to be transmitted according to the first coding format and to transmit the one or more data packets carrying the coded data to the call center.

Alternatively, the device may further include: a format notifying module 850.

The format notifying module 850 is configured to send a notification for changing the coding format to the call center, in which the first coding format is carried in the notification.

Alternatively, the device may further include: a format sending module 860, a request receiving module 870 and a format storing module 880.

The format sending module 860 is configured to send the coding format supported by a calling terminal to the call center via a SIP during a VoLTE calling.

The request receiving module 870 is configured to receive a request for verifying the coding format sent by the call center, in which the request carries the negotiated second coding format.

The format storing module 880 is configured to respond to the request and to store the second coding format.

As described above, with the device provided in embodiments of the present disclosure, a decoding mistake and the communication interruption are avoided, which are resulted from that data carried in the one or more data packets sent is by the calling terminal coded with a coding format different from the negotiated coding format, and the called terminal may be unable to decode the data with the coding format negotiated. Furthermore, it is realized that the one or more data packets received are decoded with the first coding format if the first coding format carried in the one or more data packets is different from the negotiated second coding format, thereby ensuring a high quality of the VoLTE communication.

An exemplary embodiment further provides a device for determining a coding format, which may realize a method for determining a coding format according to embodiments of the present disclosure. The device includes: a processor; and a memory configured to store an instruction executable by the processor; in which the processor is configured to: receive one or more data packets forwarded by a call center during a VoLTE, in which the one or more data packets carry a first coding format; detect whether the first coding format is same with a negotiated second coding format; and modify the coding format used during the VoLTE communication from the second coding format to the first coding format, if the first coding format is not same with the negotiated second coding format.

Figure 9:
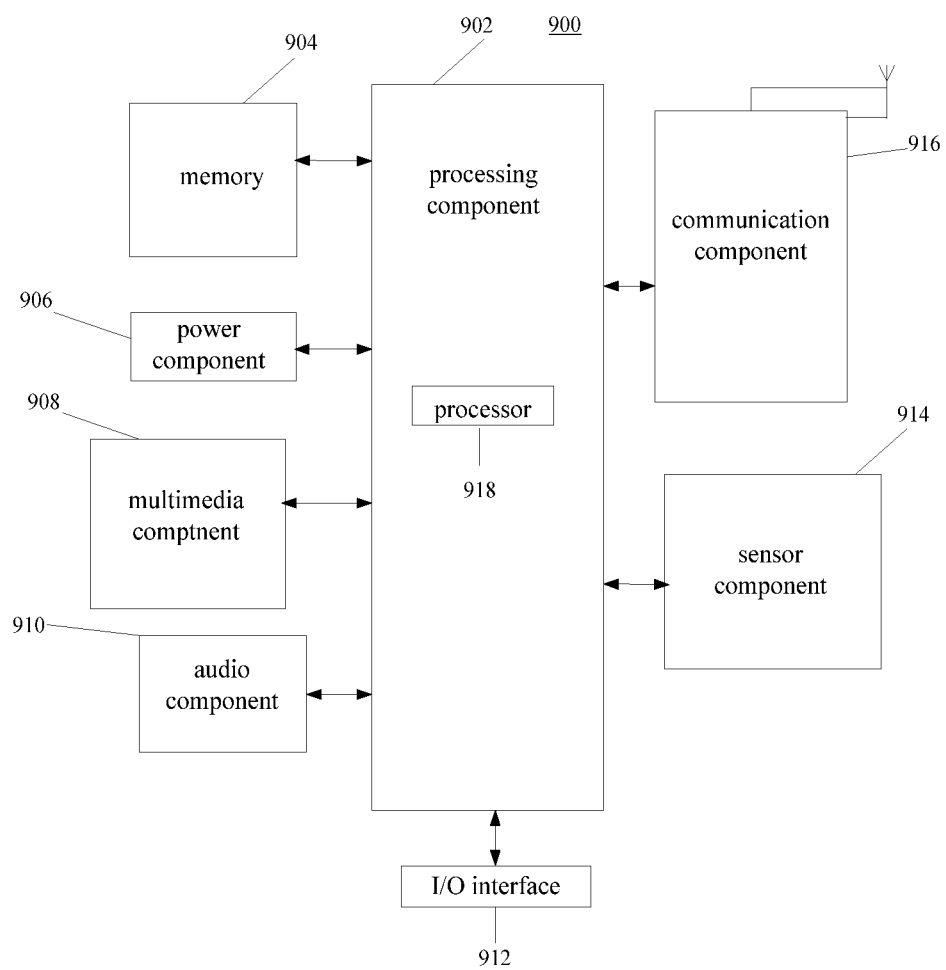
FIG. 9 is a block diagram of a device for determining a coding format according to an exemplary embodiment.

FIG. 9 is a block diagram of a device for determining a coding format according to an exemplary embodiment. For example, the device 900 may be a mobile phone, a computer, a digital broadcasting terminal, a messaging device, a game console, a tablet device, a medical device, fitness equipment, a Personal Digital Assistant PDA, and the like.

Referring to FIG. 9, the device 900 may include the following one or more components: a processing component 902, a memory 904, a power component 906, a multimedia component 908, an audio component 910, an Input/Output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 918 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a press panel (TP). If the screen includes the press panel, the screen may be implemented as a press screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some embodiments, the multimedia component 908 includes a front camera and/or a rear camera. The front camera and/or the rear camera may receive external multimedia data while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface for the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900 and relative positioning of components (e.g. the display and the keypad of the device 900). The sensor component 914 may also detect a change in position of the device 900 or of a component in the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate wired or wireless communication between the device 900 and other devices. The device 900 can access a wireless network based on a communication standard, such as WIFI, 2G or 3G or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 904 including instructions. The above instructions are executable by the processor 918 in the device 900, for performing the above-described methods. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that, the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A method for determining a coding format, the method comprising: receiving at least two data packets forwarded by a call center during a Voice over Long Term Evolution (VoLTE) communication, wherein the at least two data packets carry a first coding format; detecting whether the first coding format is same with a negotiated second coding format; and modifying the coding format used during the VoLTE communication from the second coding format to the first coding format, if the first coding format is not same with the negotiated second coding format, wherein modifying the coding format used during the VoLTE communication from the second coding format to the first coding format comprises: counting, in the at least two data packets, the number of packets of which the first coding format is different from the second coding format; detecting whether the number is greater than a predetermined threshold; modifying the coding format used during the VoLTE communication from the second coding format to the first coding format, if the number is greater than the predetermined threshold; and neglecting a data packet carrying the first coding format, if the number is smaller than the predetermined threshold.

2. The method according to claim 1, further comprising:
   coding data to be transmitted according to the first coding format; and
   transmitting the one or more data packets carrying the coded data to the call center.

3. The method according to claim 1, further comprising:
   sending a notification for modifying the coding format to the call center, wherein the notification carries the first coding format.

4. The method according to claim 1, further comprising:
   sending the coding format supported by a calling terminal to the call center via a Session Initiation Protocol (SIP) during a VoLTE calling;
   receiving a request for verifying the coding format sent by the call center, wherein the request carries the negotiated second coding format; and
   responding to the request and storing the second coding format.

5. A device for determining a coding format, the device comprising: a processor; and a memory configured to store an instruction executable by the processor; wherein the processor is configured to: receive at least two data packets forwarded by a call center during a VoLTE, wherein the at least two data packets carries a first coding format; detect whether the first coding format is same with a negotiated second coding format; and modify the coding format used during the VoLTE communication from the second coding format to the first coding format, if the first coding format is not same with the negotiated second coding format, wherein the processor configured to modify the coding format used during the VoLTE communication from the second coding format to the first coding format is further configured to: count, in the at least two data packets, the number of packets of which the first coding format is different from the second coding format; detect whether the number is greater than a predetermined threshold; modify the coding format used during the VoLTE communication from the second coding format to the first coding format, if the number is greater than the predetermined threshold; and neglect a data packet carrying the first coding format, if the number is smaller than the predetermined threshold.

6. The device according to claim 5, wherein the processor is further configured to:
   code data to be transmitted according to the first coding format; and
   transmit the one or more data packets carrying the data coded to the call center.

7. The device according to claim 5, wherein the processor is further configured to:
   send a notification for changing the coding format to the call center, wherein the notification carries the first coding format.

8. The device according to claim 5, wherein the processor is further configured to:
   send the coding format supported by a calling terminal to the call center via a SIP during a VoLTE calling;
   receive a request for verifying the coding format sent by the call center, wherein the request carries the negotiated second coding format; and
   respond to the request and store the second coding format.

9. A non-transitory computer-readable storage medium having stored therein instructions that, when executed by a processor of a device, causes the device to perform a method for determining a coding format, the method comprising: receiving at least two data packets forwarded by a call center during a VoLTE communication, wherein the at least two data packets carries a first coding format; detecting whether the first coding format is same with a negotiated second coding format; and changing the coding format used during the VoLTE communication from the second coding format to the first coding format, if the first coding format is not same with the negotiated seconding coding format, wherein changing the coding format used during the VoLTE communication from the second coding format to the first coding format comprises: counting, in the at least two data packets, the number of packets of which the first coding format is different from the second coding format; detecting whether the number is greater than a predetermined threshold; changing the coding format used during the VoLTE communication from the second coding format to the first coding format, if the number is greater than the predetermined threshold; and neglecting a data packet carrying the first coding format, if the number is smaller than the predetermined threshold.

10. The non-transitory computer-readable storage medium according to claim 9, wherein the method further comprises:
coding data to be transmitted according to the first coding format; and
transmitting the one or more data packets carrying the coded data to the call center.

11. The non-transitory computer-readable storage medium according to claim 9, wherein the method further comprises:
sending a notification for changing the coding format to the call center, wherein the notification carries the first coding format.

12. The non-transitory computer-readable storage medium according to claim 9, wherein the method further comprises:
sending the coding format supported by a calling terminal to the call center via a SIP during a VoLTE calling;
receiving a request for verifying the coding format sent by the call center, wherein the request carries the negotiated second coding format; and
responding to the request and storing the second coding format.

* * * * *